United States Patent
Ryabinin et al.

(10) Patent No.: US 10,922,507 B2
(45) Date of Patent: Feb. 16, 2021

(54) DATA READER WITH FRONT-FACING CONNECTOR PANEL

(71) Applicant: DATALOGIC USA, INC., Eugene, OR (US)

(72) Inventors: Stepan Ryabinin, Eugene, OR (US); Kelvin Dietz, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 344 days.

(21) Appl. No.: 15/774,555

(22) PCT Filed: Dec. 4, 2015

(86) PCT No.: PCT/US2015/064111
§ 371 (c)(1),
(2) Date: May 8, 2018

(87) PCT Pub. No.: WO2017/095450
PCT Pub. Date: Jun. 8, 2017

(65) Prior Publication Data
US 2020/0257868 A1    Aug. 13, 2020

(51) Int. Cl.
*G06K 7/10* (2006.01)
*G06K 19/06* (2006.01)

(52) U.S. Cl.
CPC ... *G06K 7/10821* (2013.01); *G06K 19/06046* (2013.01)

(58) Field of Classification Search
CPC ......... G06K 7/10821; G06K 19/06046; G06K 19/06037
See application file for complete search history.

(56) References Cited

U.S. PATENT DOCUMENTS 4,762,984 A * 8/1988 Knowles ............ G06K 7/10871
                                               235/383
4,968,883 A   11/1990 Leyshon et al.
4,971,177 A * 11/1990 Nojiri ................ G01G 19/4144
                                               177/245

(Continued)

FOREIGN PATENT DOCUMENTS

EP    1760631 A1      3/2007
JP    03291775 A  * 12/1991
JP   2005223748 A     8/2005

OTHER PUBLICATIONS https://www.honeywellaidc.com/en/-/media/en/files-public/technical-publications/multi-product/solar-std-enus-in%20rev%20a%20pdf.pdf (Year: 2015).*

(Continued)

*Primary Examiner* — Daniel I Walsh
(74) *Attorney, Agent, or Firm* — Stoel Rives LLP

(57) ABSTRACT

A data reader (100, 200, 300, 400, 500) and connector system including a housing (110, 210, 310, 410); side walls enclosing an interior, one of the side walls formed with a cable exit opening; a printed circuit board (140, 240, 340, 440) mounted parallel to and proximate one of the side walls; a socket (149, 249, 349, 449) mounted on the printed circuit board and facing inwardly into an interior of the housing and opposite the side wall formed with the cable exit opening; and a cable (179, 279, 379, 479) connected to the socket, cable formed with a loop within the housing from the first socket and out through the cable exit opening.

25 Claims, 10 Drawing Sheets

(56) References Cited

U.S. PATENT DOCUMENTS

| | | | | |
|---|---|---|---|---|
| 5,378,882 | A * | 1/1995 | Gong | G06K 7/10881 |
| | | | | 235/462.45 |
| 5,900,613 | A * | 5/1999 | Koziol | G06K 7/10851 |
| | | | | 235/462.15 |
| 5,929,418 | A * | 7/1999 | Ehrhart | G06K 7/10851 |
| | | | | 235/462.27 |
| 6,053,410 | A * | 4/2000 | Wike, Jr. | G06F 1/16 |
| | | | | 235/462.43 |
| 6,089,772 | A * | 7/2000 | Takemura | B41J 13/106 |
| | | | | 400/625 |
| 6,158,655 | A * | 12/2000 | DeVries, Jr. | B60R 1/12 |
| | | | | 235/380 |
| 6,161,758 | A * | 12/2000 | Collins, Jr. | G01G 19/4144 |
| | | | | 177/25.14 |
| 8,025,514 | B1 * | 9/2011 | Wang | H01R 13/6397 |
| | | | | 439/172 |
| D671,542 | S | 11/2012 | Siekmann et al. | |
| 8,789,755 | B2 | 7/2014 | Calderon | |
| 8,919,651 | B2 | 12/2014 | Gao et al. | |
| 10,395,082 | B1 * | 8/2019 | Thompson | G06K 7/1098 |
| 2004/0056099 | A1 | 3/2004 | Barkan | |
| 2004/0206821 | A1 * | 10/2004 | Longacre, Jr. | G06K 17/0022 |
| | | | | 235/462.07 |
| 2004/0262394 | A1 * | 12/2004 | Longacre, Jr. | G06K 7/14 |
| | | | | 235/462.15 |
| 2006/0097054 | A1 * | 5/2006 | Biss | G01N 21/8806 |
| | | | | 235/462.45 |
| 2008/0200050 | A1 * | 8/2008 | Byrne | H02G 3/185 |
| | | | | 439/131 |
| 2008/0296388 | A1 * | 12/2008 | Drzymala | G06K 7/10722 |
| | | | | 235/462.42 |
| 2008/0302873 | A1 * | 12/2008 | Kotlarsky | G06K 7/10712 |
| | | | | 235/462.15 |
| 2009/0014574 | A1 * | 1/2009 | Tollefson | E05B 67/006 |
| | | | | 242/384.4 |
| 2009/0230194 | A1 * | 9/2009 | Calderon | G06K 7/10554 |
| | | | | 235/462.43 |
| 2012/0018516 | A1 | 1/2012 | Gao et al. | |
| 2012/0199654 | A1 * | 8/2012 | Zhu | G06K 7/10732 |
| | | | | 235/455 |
| 2013/0067966 | A1 * | 3/2013 | Wheeler | E05B 45/005 |
| | | | | 70/15 |
| 2013/0235403 | A1 * | 9/2013 | Takara | H04N 1/00084 |
| | | | | 358/1.13 |
| 2018/0081127 | A1 * | 3/2018 | Coenegracht | G02B 6/3897 |
| 2018/0113268 | A1 * | 4/2018 | Van Baelen | G02B 6/444 |
| 2018/0342317 | A1 * | 11/2018 | Skirble | G16H 20/17 |
| 2019/0363512 | A1 * | 11/2019 | Shimoyama | G02B 26/101 |
| 2020/0065638 | A1 * | 2/2020 | Nakai | H04N 1/00962 |
| 2020/0226334 | A1 * | 7/2020 | Handshaw | G06K 7/10722 |
| 2020/0257868 | A1 * | 8/2020 | Ryabinin | G06K 7/10821 |

OTHER PUBLICATIONS

"Right Angle PCB Mount 6P6C RJ11 Socket Modular Jack Telephone Connector", (http://www.ebay.com/itm/like/321452033768, one page, Visited Nov. 20, 2015.

Zebra Technologies DS7708 2D Vertical Slot Scanner Product Reference Guide, p/n. MN001062AXX, select pp. 1, 3, 5, 31, 32, 666 (https://www.zebra.com/content/dam/zebra_new_ia/en-us/manuals/barcode-scanners/ds7708-2d-vertical-slot-scanner-product-reference-guide-en-us.pdf) Visited May 1, 2018.

Datalogic Magellan(tm) 3200 Product Reference Guide, select pp. 1-11, 212 (2010-2014).

* cited by examiner

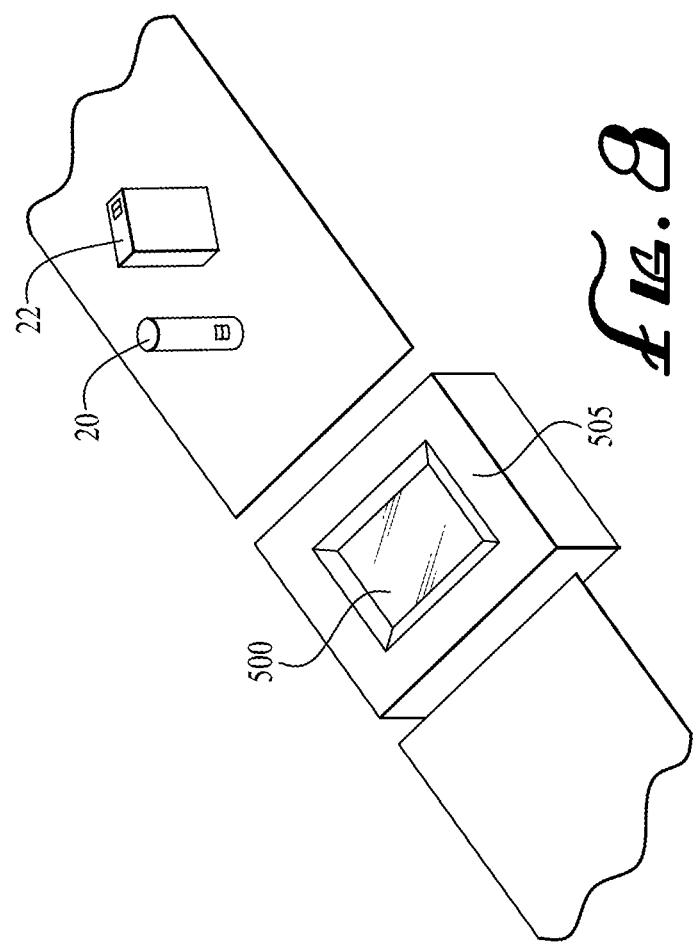
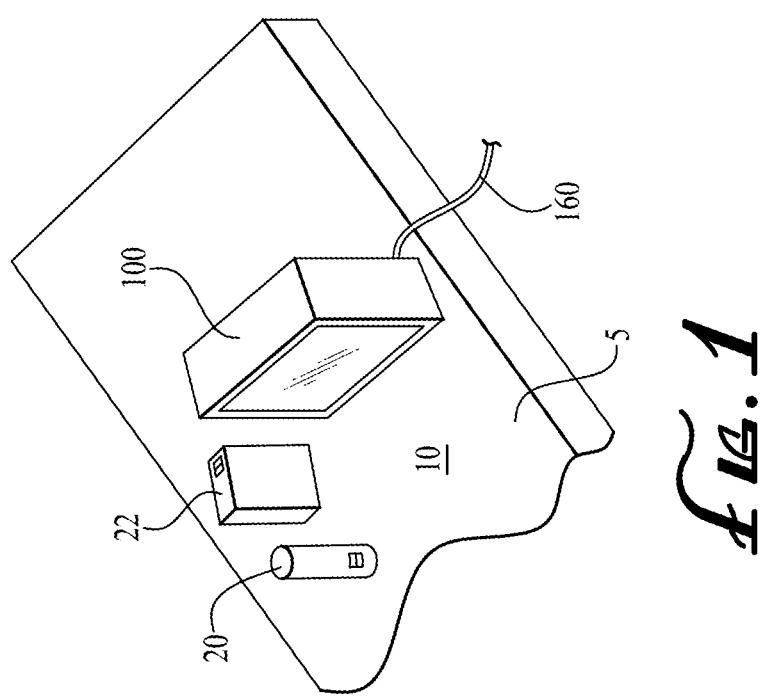

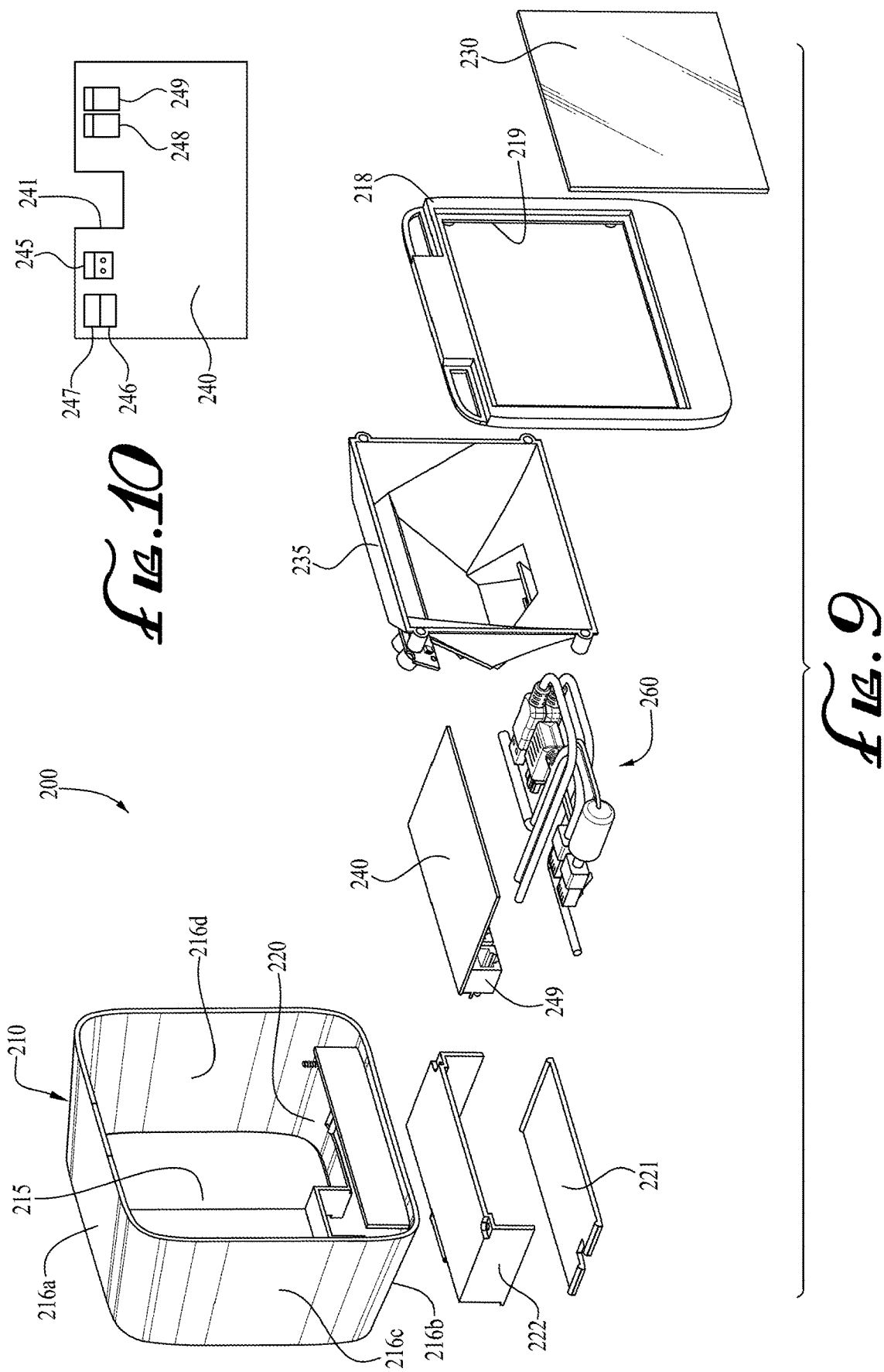

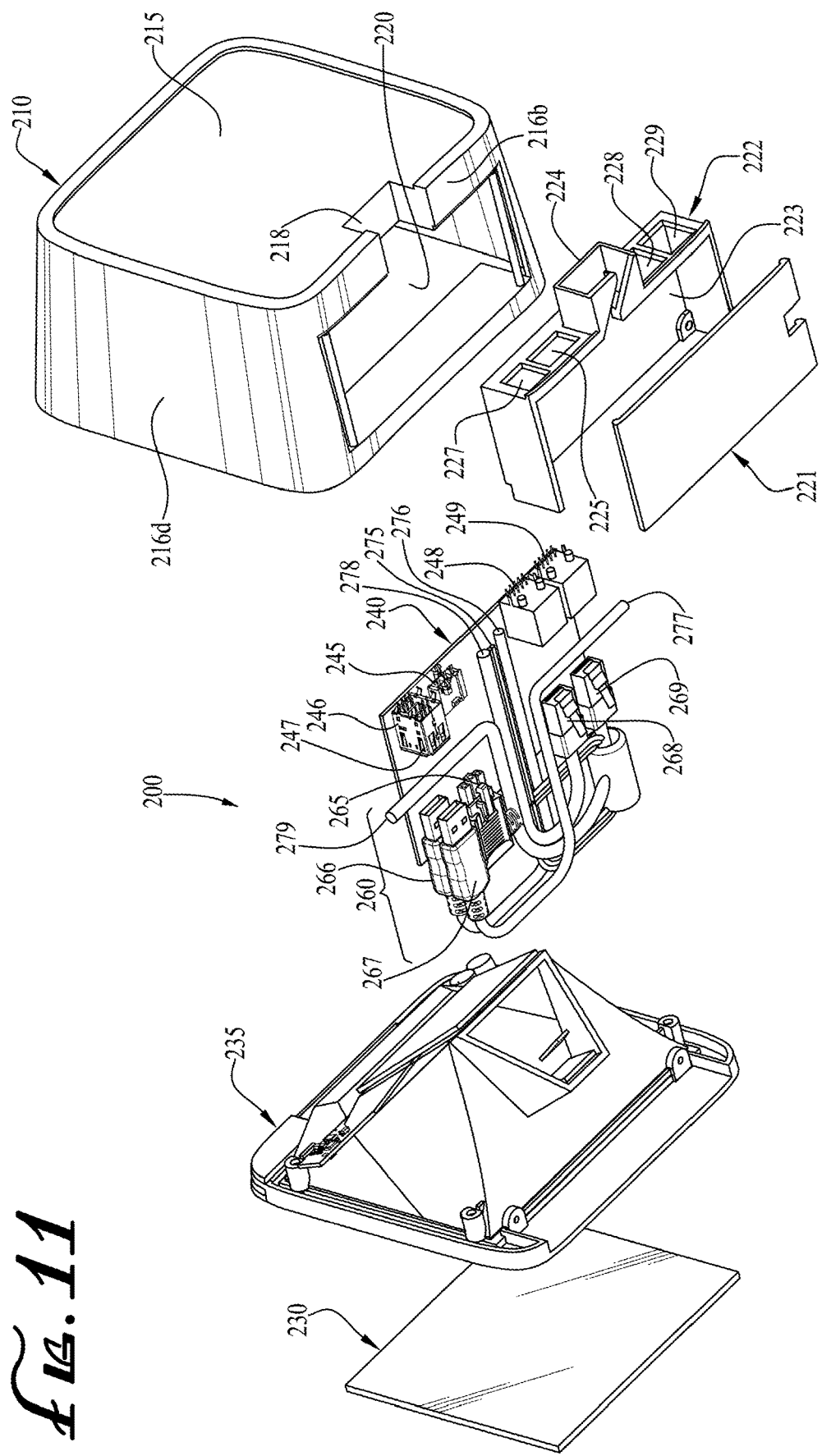

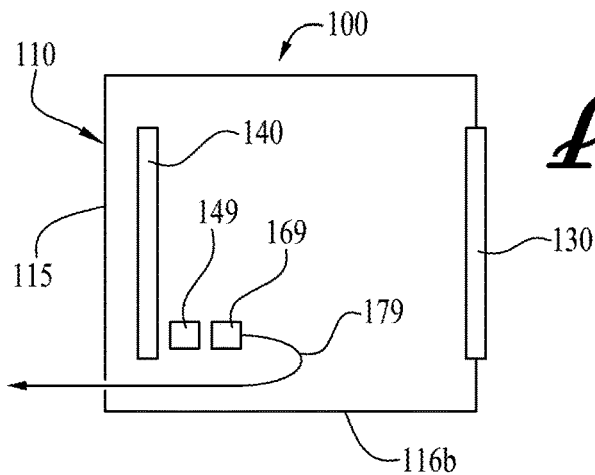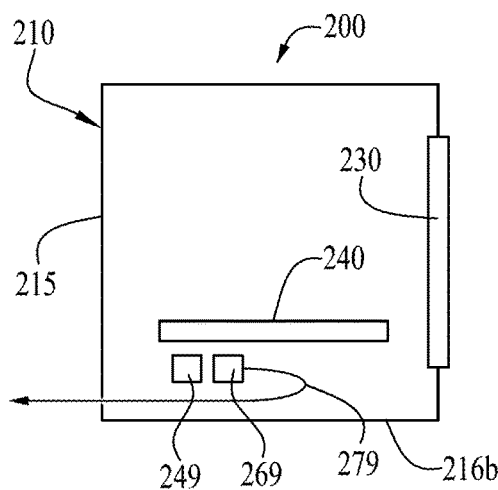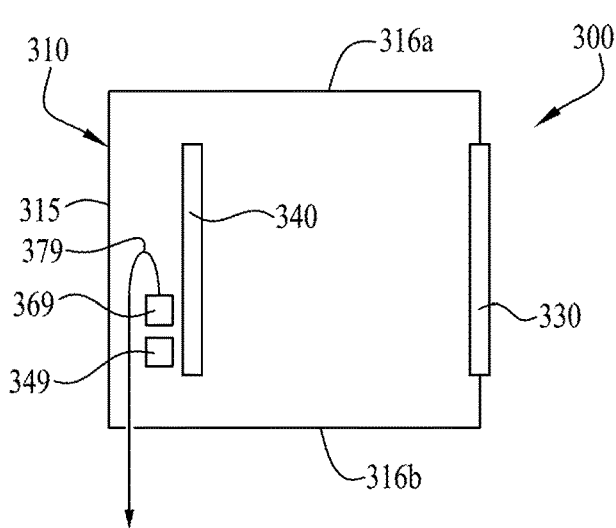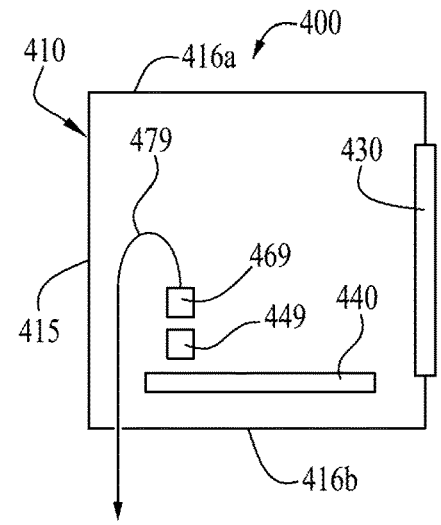

DATA READER WITH FRONT-FACING CONNECTOR PANEL

BACKGROUND

The field of this disclosure relates generally to systems and methods for data reading and/or image capture, and more particularly, to connector arrangements for data readers.

Data reading devices are used to read optical codes, acquire data, and capture a variety of images. Data reading devices are well known for reading UPC and other types of optical codes on packages, particularly in retail stores, inventory control and package handling/shipment. One common data reader is an imaging reader that employs an imaging device or sensor array, such as a CCD (charge coupled device) or CMOS (complementary metal oxide semiconductor) device. Another common data reader is a laser-based scanner that uses a moving laser beam to sweep a laser spot across the barcode.

These data reading devices generally comprise a housing having a front opening or window and a plurality of elements disposed within the housing. Such elements may include a printed circuit board (PCB) on which various electronic components (e.g., processor, light source, detector/imager, electrical connectors) are mounted, mirrors, or other optical elements. The housing may be arranged either with the opening/window either in a vertical plane or in a horizontal plane depending upon the configuration of the counter.

The present inventors have recognized that single-plane data readers have many connections for power, point of sale communications and other accessories; that the size of the scanner is limited and therefore the connector positioning is important for easy installation and usage of the scanner; and that cables attached to the connectors have various features that inhibit cable movement or otherwise require additional space.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings.

FIG. 1 is a diagrammatic isometric view of a vertical data reader positioned on a retail checkout counter according to an embodiment.

FIG. 8 is a diagrammatic isometric view of a horizontal data reader positioned in a retail checkout counter according to another embodiment.

FIG. 9 is an exploded top front isometric view of a data reader according to another embodiment.

FIG. 10 is a bottom plan view of the PCB of the data reader of FIG. 9.

FIG. 11 is an exploded bottom rear view of the data reader of FIG. 9.

FIGS. 12-15 are diagrammatic views of data readers in accordance with four embodiments.

DETAILED DESCRIPTION OF EMBODIMENTS

Figure 2:
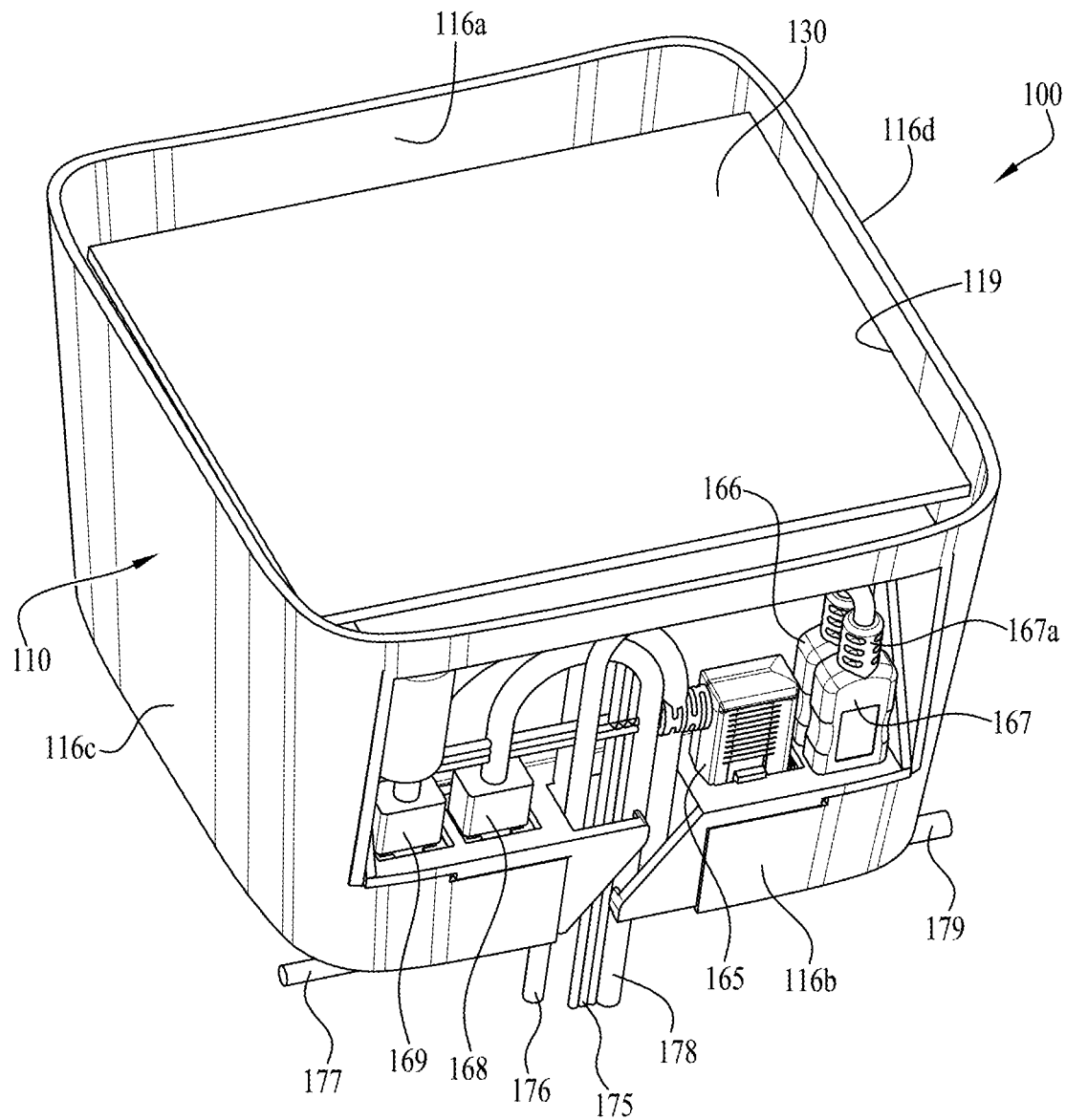
FIG. 2 is a front bottom isometric view of a data reader, according to a first embodiment, with a bottom cover removed.
Figure 3:
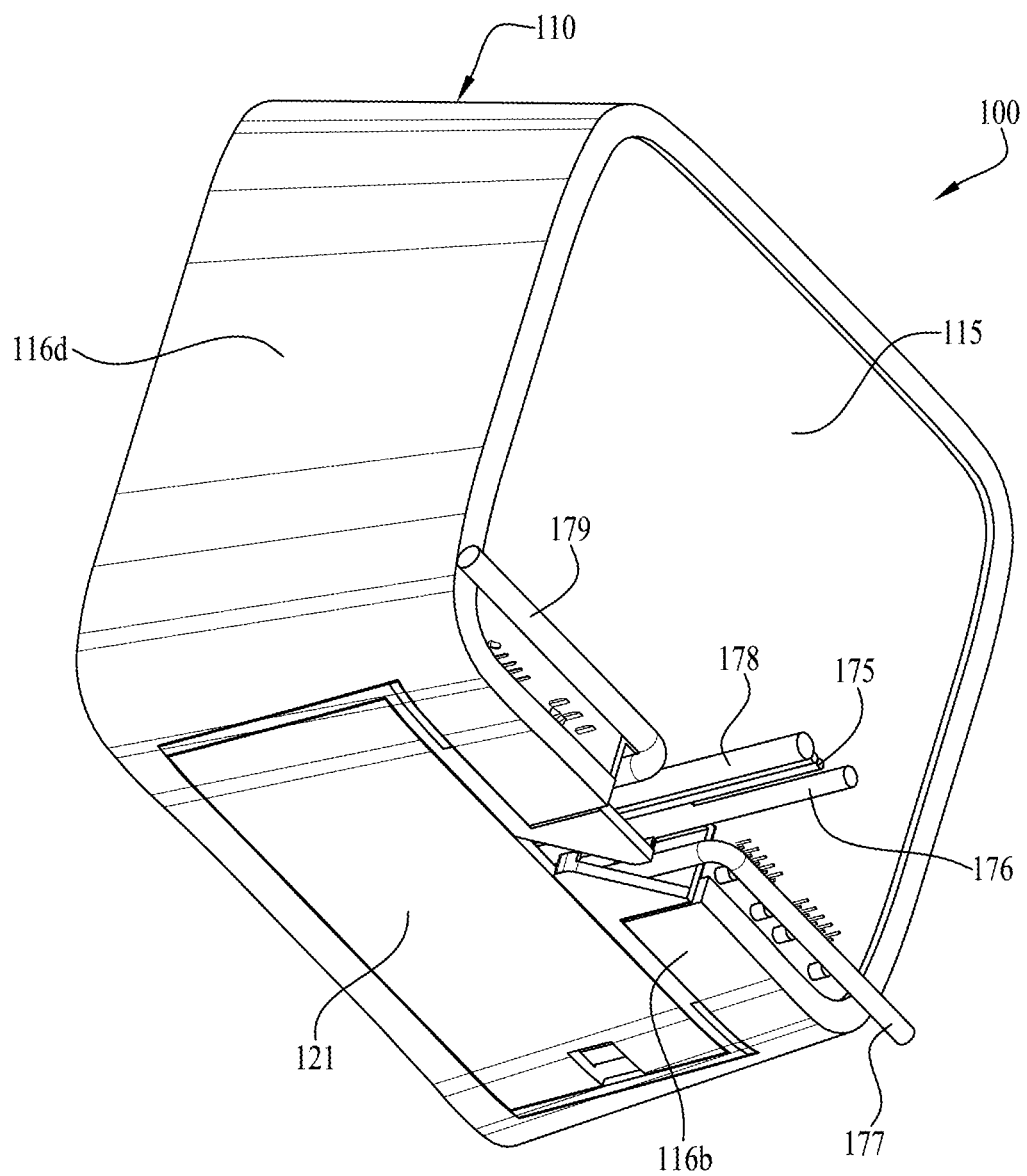
FIG. 3 is a bottom rear isometric view of the data reader of FIG. 2, with a bottom cover in place.
Figure 4:
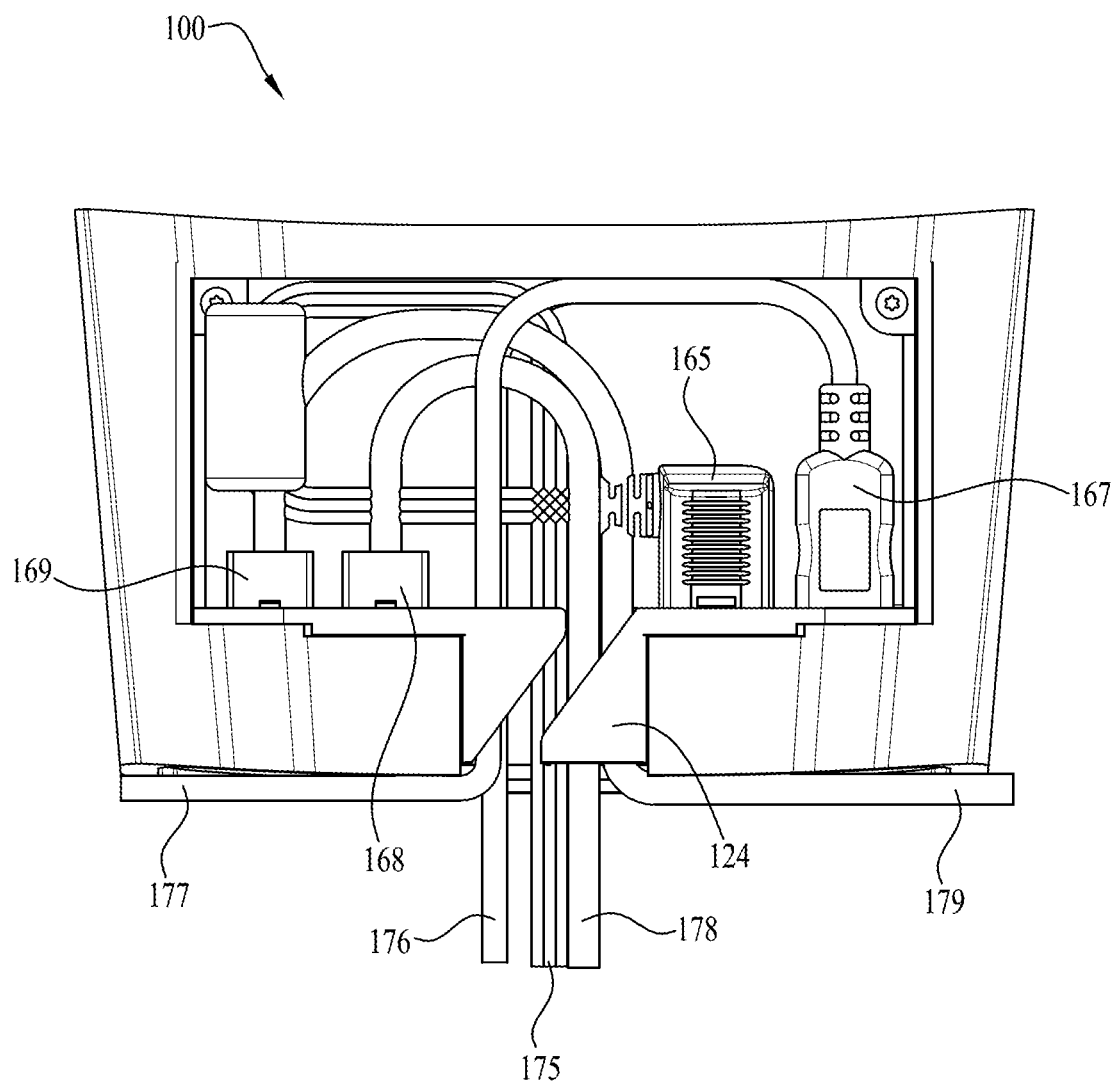
FIG. 4 is a bottom plan view of the data reader of FIGS. 2-3 with the bottom cover removed.

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Various data readers are described herein. For the purposes of the present disclosure, some of the embodiments may be described as data readers or optical/barcode scanners, but either description shall refer to imaging readers or laser scanners used to read optical codes, acquire data, and/or capture images. In the following description of the figures and any example embodiments, it should be understood that use of a data reader having the described features as a countertop scanner in a retail establishment is merely one configuration/use for such a system. Other uses for data readers with the characteristics and features described are applicable, for example, in an industrial location such as a parcel distribution (e.g., postal, shipping) station or an inventory or warehouse station.

FIG. 1 illustrates a data reader 100 disposed on a retail checkout counter 5 along with exemplary items (e.g., a can 20 and a box 22), each item bearing a barcode, whereby the items 20, 22 may be passed through or presented in a view/read volume 10 of the data reader 100.

FIGS. 2-7 illustrate details of the data reader 100 according to a first embodiment. The data reader 100 comprises a single aperture/window reader having a housing 110 with a front aperture 119 or reader window 130 through which the data reader 100 reads and/or captures images of items 20, 22 in the read volume 10, a printed circuit board (PCB) 140, and a mirror basket or chassis 135. The housing 110 may be of any suitable shape, but is illustrated as generally box-shaped and includes a front portion 112 (containing the front aperture 119 or reader window 130) and a rear portion 114 (comprising a rear wall 115), with sidewalls (top wall 116a, bottom wall 116b, and lateral sidewalls 116c, 116d) extending between the front portion 112 and the rear portion 114. An interior chamber is formed within the housing 110 between the front portion 112 and the rear portion 114 for accommodating the internal components, namely the PCB 140, the chassis 135, and the bottom cable cavity 120.

The window 130 may comprise a window pane which may be a single flat plate of transparent glass or other suitable material. The window 130 may alternatively include multiple transparent (or semi-transparent) layers and further include suitable coatings. The window 130 may be arranged in a vertical plane (when the unit is disposed as a vertical reader as in FIG. 1) and parallel to the rear wall 115.

Alternatively, the window 130 may be constructed with a tilt at an acute angle to the vertical, if desired, such as for reflection purposes.

The printed circuit board (PCB 140) of the data reader 100 is disposed within the interior chamber parallel to and proximate/adjacent the rear wall 115. The PCB 140 may be mounted within the housing 110 such as by a shock-mounted connection (e.g., screws with flexible nylon washers) to the rear wall 115. The PCB 140 includes the data reader circuitry/electronics such as processing unit 143 (e.g., a microprocessor) and other processor circuitry, memory, detector/imager(s) 142, controllers, firmware, and one or more electrical connectors. The PCB circuitry may be disposed on one or both sides of the PCB 140. The PCB 140 is constructed with a notch 141 formed in one lateral side thereof. The processing unit 143 may be any of various suitable commercially available processors or other logic machine capable of executing instructions. Alternatively, suitable dual microprocessors or other multi-processor architectures may also be employed as the processing unit 143.

The electrical connectors are mounted directly to the PCB 140 along one edge on opposite sides of the notch 141. In an example embodiment as illustrated, the PCB 140 includes five connectors or sockets: two communication connectors 148, 149 (arranged side-by-side to a first side of the notch 141), two USB connectors 146, 147 (arranged in a stacked position on a second side of the notch 141), and a power connector 145 (disposed between the notch 141 and the USB connectors). The connectors 145-149 are straight connectors, each connector facing away from the PCB 140 and facing toward a front of the data reader 100. The PCB 140 may be configured with another number of connectors, for example a single connector (such as a USB connector that provides both power and communication), or multiple connectors (e.g., two to five connectors or more connectors).

The cable cavity 120 is formed with an L-shaped wall section 122 with a top plate section 123 and rear section having openings to accommodate the cabling 160 (including the connectors 145-149 and the cables 175-179). The wall section 122 includes a central channel 124 disposed in alignment with the notch 141, openings 128, 129 to accommodate communication connectors 148, 149, opening 125 to accommodate power connector 145, and opening 127 to accommodate USB connectors 146, 147.

The connectors 145-149 are configured as straight sockets/connectors whereby the socket opening faces away from the PCB 140 such that the socket opening faces the window 130 when the PCB 140 is mounted along the rear wall 115 parallel to the window/aperture 130/119.

The embodiment of FIGS. 2-7 illustrates that the data reader 100 may be connected by a plurality of cables, identified collectively as cabling 160, including five cables 175, 176, 177, 178, 179 with adequate space to be routed through an opening 118 in the rear wall 115, then through the central channel 124 whereby each cable 175-179 forms a loop (shown as a 180° loop) within the cable cavity 120 before plugging into a respective socket/connector 145-149. The 180° loop of cable may be described as disposed in a plane perpendicular to the PCB 140 and rear wall 115 (as well as the window 130) and parallel to bottom wall 116b. Power cable 175 has end plug 165 that plugs into connector 145 and is shown routing perpendicularly out through the rear wall 115. USB cable 176 has an end plug 166 that plugs into connector 146 and is shown routing perpendicularly out through the rear wall 115. USB cable 177 has an end plug 167 that plugs into connector 147 and is shown routing out past side wall 116c. Communication cable 178 (e.g., CAT5 or CAT6 cable) has an end plug 168 (e.g., RJ45 connector) that plugs into connector 148 and is shown routing perpendicularly out through the rear wall 115. Communication cable 179 (e.g., CAT5 or CAT6 cable) has an end plug 169 (e.g., RJ45 connector) that plugs into connector 149 and is shown routing out past side wall 116d. Other suitable cable types and connectors (such as RS232, coaxial, or optical) may be employed. The cables and related connectors are configured to send optical and/or electrical signals to and from the data reader 100 for providing data communications and/or power connections.

The bottom of the data reader 100 may be provided with a removable cover 121 that may be pivoted or removed to provide access to the cable cavity 120 and allow the cables 175-179 to be routed and plugged into the connectors 145-149. Enclosing the cables 175-179 and connectors 145-149 within the cable cavity 120 provides protection to the cables 175-179 and connectors 145-149 while keeping them in a location where they can be easily accessed and routed with less possibility of damage. The connector location allows sections of the cables 175-179 to be completely enclosed within the overall extant/volume of the reader housing 110. The cable and connector placement also allows the cables 175-179 to be routed in almost any direction (front, back, sides and down) for easy installation. The configuration of the cable cavity 120 also makes accessing the cables very simple. Slightly tipping the data reader housing 110 backward or forward (and removing the cover 121) exposes the entire cable cavity 120. Alternatively, the cable cavity 120 may be visible/accessible from the front of the reader 100, whereby in such an alternative embodiment a front removable panel may be included in the front portion 112 below the window 130, or other suitable access provided.

There are many applications in which the data reader may be placed in an enclosure or otherwise restrictive enclosed area. This improved access to the cable cavity 120 is advantageous over prior configurations that have connectors that are not easily accessible from the front or bottom of the data reader making installation and use more difficult.

The cables 175-179 may optionally include strain relief of various size and shape or other elements attached on a cable (such as a ferrite bead 167a on connector plug 167 in FIG. 2). Such strain relief features may be easily enclosed and protected within the recessed area of cable cavity 120. The cables 175-179 are also routed with a loop forming a gradual 180° loop/curve without sharp bending. Cable ties or other attachment features may optionally be used to secure the cables to the housing to help hold the cables in place and to route the cables in various directions. The gradual 180° cable routing curve minimizes strain or pulling on the plugs 165-169 and connectors 145-149, and further serves to minimize strain or unplugging forces on the connection between the plugs 165-169 and their respective connectors 145-149.

The connector configuration for cabling 160 may place less constraints on the PCB design. The PCB 140 may be placed in a vertical orientation allowing for maximum utilization of available surface area. The PCB 140 may be a simpler shape due to reduced clearance issues with cables or other features of the scanner. as shown in the figures, cables may be routed toward the exterior on all four directions (front, rear, both sides), therefore providing increased ease of mounting.

In the configuration of FIG. 2, the cable cavity 220 is proximate the bottom wall 216b allowing for convenient access. The cables 274-279 are disposed in a common plane thereby simplifying design of the PCB 140.

Specific shape of cable cavity creates pathways that ease routing cables in the desired direction, consequently, additional volume for the cable cavity is provided (for bending and routing the cables) thereby reducing strain on cabling because the cables are already exiting oriented in the desired direction due to the shape of the cable cavity and cable routing features.

Though the embodiment of FIGS. 1-7 illustrate the data reader 100 in a vertical configuration on a checkout counter 5, as shown in FIG. 8, the data reader 500 may be arranged in a horizontal configuration within a checkout counter 505.

In a second embodiment, FIGS. 9-11 illustrate a data reader 200 comprising a single aperture/window reader of similar configuration to the data reader 100 of FIGS. 2-7, except primarily having its PCB 240 disposed in a bottom portion of the housing 210. The data reader 200 includes a housing 210 with a front aperture 219 or reader window 230 through which the data reader 200 reads and/or captures images of items, a PCB 240, and a chassis or mirror basket 235. The housing 210 is illustrated as generally box-shaped and includes a front portion (containing the front aperture 219 or reader window 230) and a rear portion (comprising a rear wall 215) with sidewalls (top wall 216a, bottom wall 216b, and lateral sidewalls 216c, 216d) extending between the front portion and the rear portion. An interior chamber is formed within the housing 210 between the front portion and the rear portion for accommodating the internal components namely the PCB 240, the chassis 235, and the bottom cable cavity 220.

As an example, the PCB 240 includes five connectors or sockets: two communication connectors 248, 249 (arranged side-by-side to a first side of an optional notch 241 in the PCB 240), two USB connectors 246, 247 (arranged side-by-side on a second side of the notch 241), and a power connector 245 (disposed between the notch 241 and the USB connectors 246,247). Each of the connectors 245-249 is a right angle connector attached to a bottom of the PCB 240, oriented facing away from the PCB 240 and facing toward a front (e.g., the reader window 230) of the data reader 200. The PCB 240 may be configured with another number of connectors. The notch 241 in the PCB 240 may be omitted.

The cable cavity 220 is formed with an L-shaped wall section 222 with a top plate section 223 and rear section having openings to accommodate the cabling 260 (including the connectors 245-249 and the cables 275-279). The wall section 222 includes: a central channel 224 disposed in alignment with the rear wall opening 218; openings 228, 229 to accommodate communication connectors 248, 249: opening 225 to accommodate power connector 245; and opening 227 to accommodate USB connectors 246, 247.

The PCB 240 is rectangular and the cables 275, 276, 277, 278, 279 are provided with adequate space to be routed through the opening 218 in the rear wall 215 whereby each cable forms a 180° loop within the cable cavity 220 when each plug 265-269 is plugged into a respective socket/connector 245-249. The connectors 245-249 are configured as right angle sockets/connectors whereby the socket opening faces along/parallel the PCB 240, the socket opening facing the window 230 when the PCB 240 is mounted along the bottom wall 216b perpendicular to the opening containing window 230. The bottom of the data reader 200 may be provided with a removable cover 221 that may be pivoted or removed to provide access to the cable cavity 220 and allow the cables 275-279 to be routed and plugged into the connectors 245-249.

Various cable connector configurations are envisioned, four example configurations are illustrated in the four diagrams of FIGS. 12-15. Each of the diagrams illustrate only a single cable and connector pair, but multiple cables may be implemented.

Figure 5:
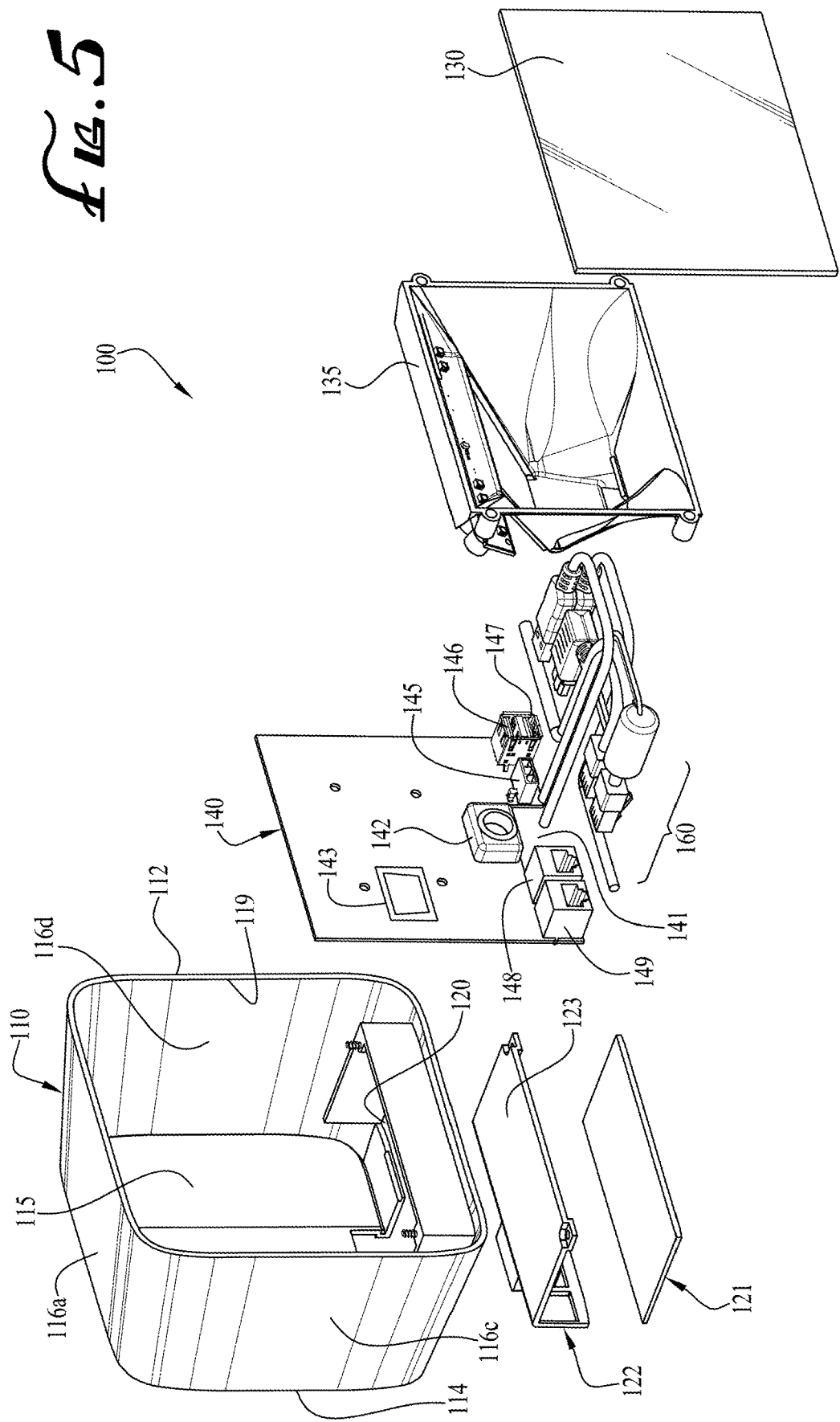
FIG. 5 is an exploded top front isometric view of the data reader of FIGS. 2-4.
Figure 6:
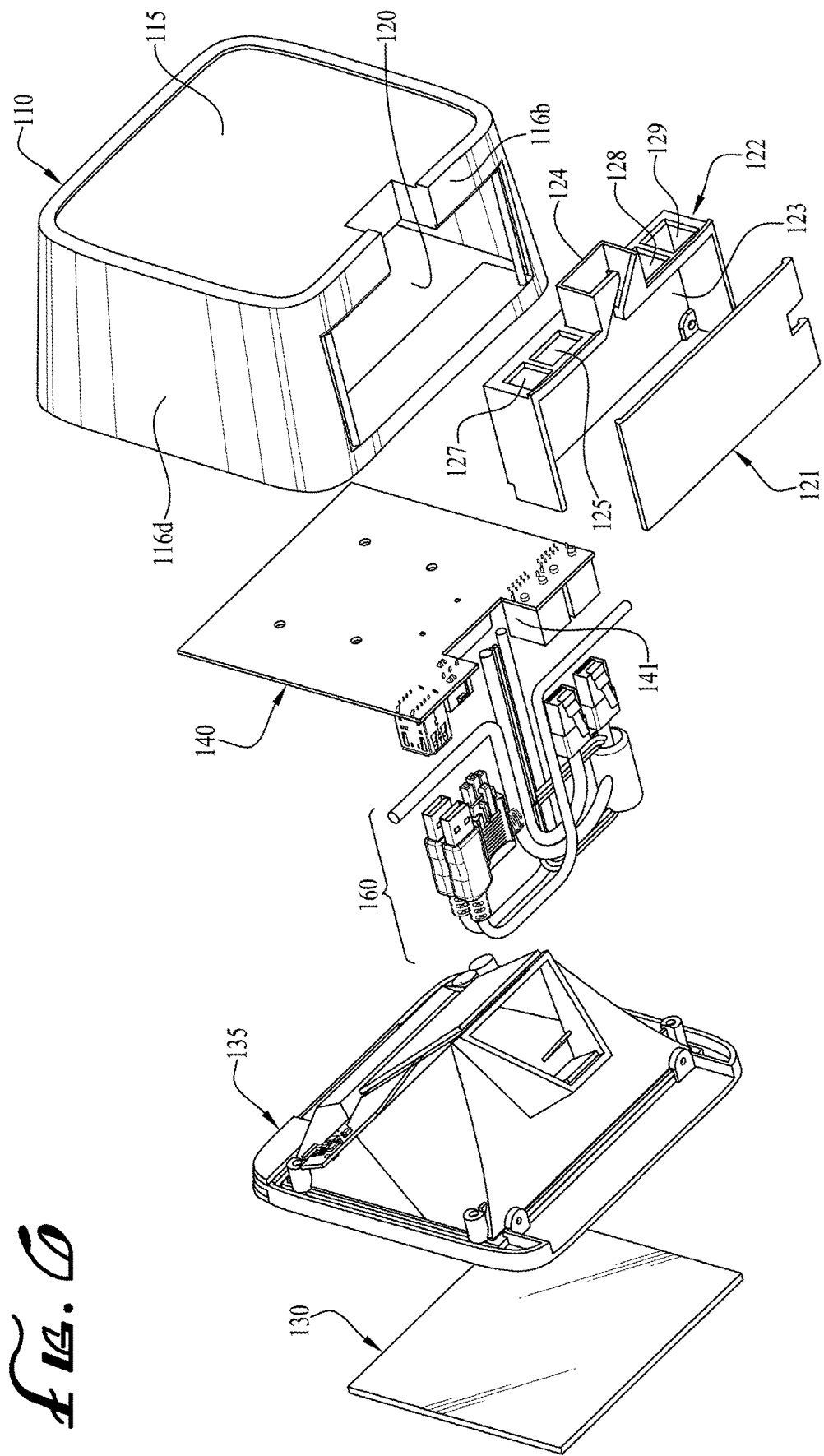
FIG. 6 is an exploded bottom rear isometric view of the data reader of FIGS. 2-4.
Figure 7:
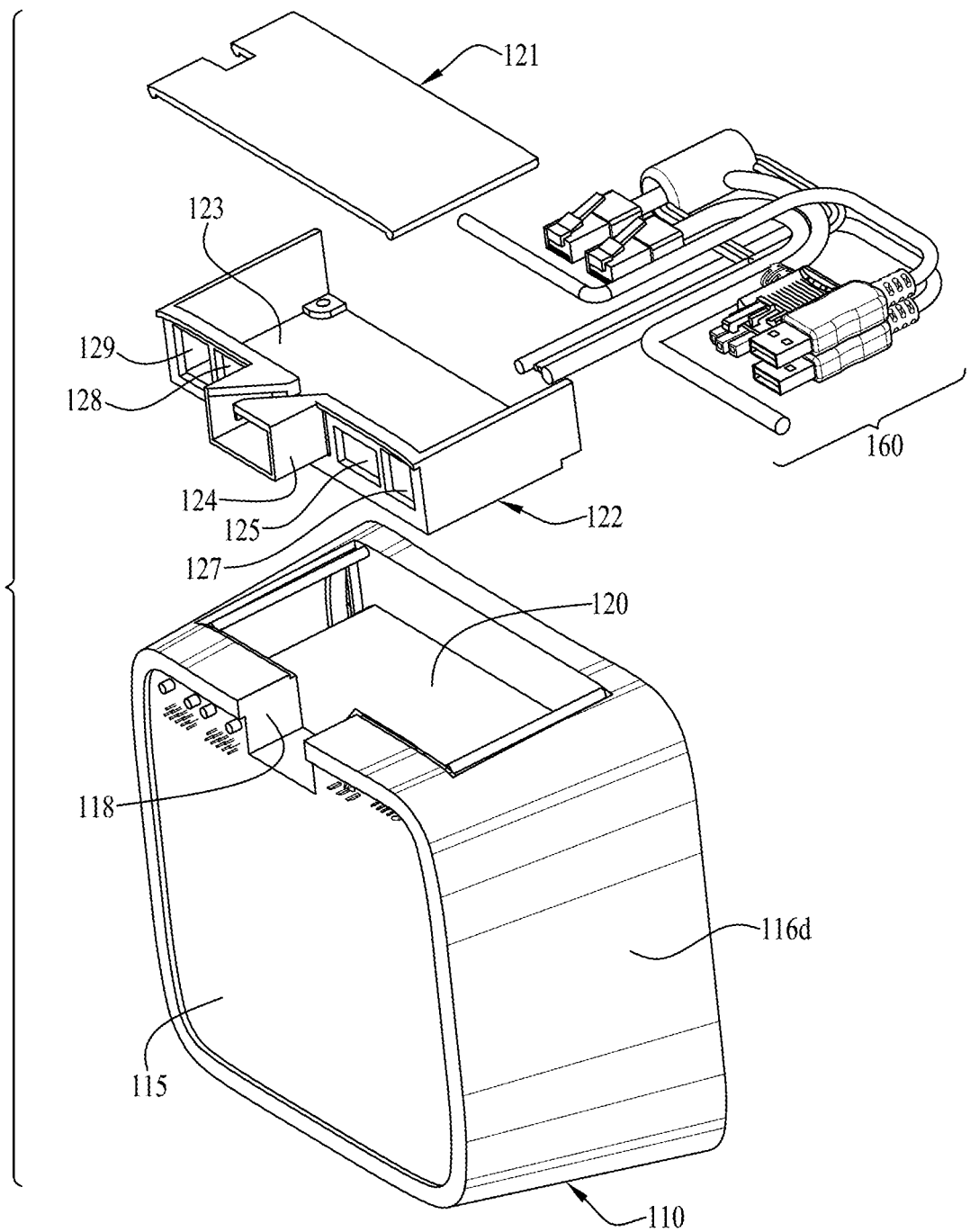
FIG. 7 is an exploded isometric view of the data reader of FIGS. 2-4 with the data reader inverted and the PCB omitted.

FIG. 12 is a diagrammatic layout of the data reader 100 as in FIG. 2 with a housing 110, a front window 130, a PCB 140 disposed on the rear wall 115, a first socket 149 (a straight connector) on the PCB 140 and facing the window 130, a first plug/connector 169 plugged into the first socket 149, and a first cable 179. The first cable is formed in a 180° loop (disposed in a cavity above the bottom wall 116b) extending from the first plug 169 (optionally through a notch in the PCB 140, as shown in FIG. 5) and out through an opening in the rear wall 115.

FIG. 13 is a diagrammatic layout of the data reader 200 as in FIGS. 9-11 with a housing 210, a reader window 230, a PCB 240 proximate the bottom wall 216b, a first socket/connector 249 (a right angle connector) on the PCB 240 facing the window 230, a first plug/connector 269 plugged into the first connector 249, and a first cable 279. The first cable 279 is formed in a 180° loop extending out through an opening in the rear wall 215.

FIG. 14 is a diagrammatic layout of a data reader 300 with a housing 310, a reader window 330, a PCB 340 proximate a rear wall 315, a first socket 349 (a right angle connector) on the PCB 340 facing the top wall 316a, a first plug/connector 369 plugged into the first socket 349, and a first cable 379. The first cable 379 is formed in a 180° loop, extending out through an opening in the bottom wall 316b.

FIG. 15 is a diagrammatic layout of a data reader 400 with housing 410, a reader window 430, a PCB 440 proximate and parallel to a bottom wall 416b, a first socket 449 (a straight connector) on the PCB 440 facing the top wall 416a, a first plug/connector 469 plugged into the first socket 449, and a first cable 479. The first cable 479 is formed in a 180° loop along the rear wall 415, extending out through an opening in the bottom wall 416b.

Although the description above contains certain specific details, these details should not be construed as limiting the scope of the invention, but as merely providing illustrations of some embodiments/examples. It should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the inventions.

The invention claimed is:

1. A data reader configured for connection to a cable attached to a connector, the data reader comprising:
   a housing including a front portion, a rear portion and a bottom portion, the housing having a top side, a bottom side and first and second lateral sides extending between the front portion and the rear portion;
   a front window disposed in the front portion of the housing;
   a cavity formed in the bottom portion of the housing, wherein the cavity includes a rear wall that is parallel to the front window; and
   a first socket positioned proximate the rear wall, wherein the first socket is oriented with its opening facing toward the front window to receive a first connector of a first cable in a first direction that is oriented perpendicular to the front window.

2. The data reader of claim 1, wherein the first cable is operative for providing at least one of communication and power to the data reader, the first cable passing through an opening in the rear wall and forming a 180° loop within the cavity.

3. The data reader of claim 2, wherein the 180° loop is disposed in a plane perpendicular to the rear wall and parallel to a bottom side of the housing.

4. The data reader of claim 1, further comprising:
a printed circuit board (PCB) disposed in the rear portion of the housing, and parallel to the front window, wherein the first socket is mounted to and electrically connected to the PCB.

5. The data reader of claim 4, wherein the first socket comprises a straight connector.

6. The data reader of claim 5, further comprising
a second socket positioned proximate the rear wall, wherein the second socket is oriented with its opening facing toward the front window to receive a second connector of a second cable in a first direction that is oriented perpendicular to the rear wall.

7. The data reader of claim 6, further comprising
a third socket mounted to and electrically connected to the PCB, the third socket positioned on or proximate the rear wall, wherein the third socket is oriented with its opening facing toward the front window to receive a third connector of a third cable in a first direction that is perpendicular to the rear wall.

8. The data reader of claim 4, wherein the PCB comprises a U-shape having a central portion, first and second leg portions, and an opening between the first and second leg portions.

9. The data reader of claim 8, wherein the first socket is mounted directly to the PCB and along an edge of the first leg proximate to the opening.

10. The data reader of claim 9, further comprising a second socket is mounted directly to the PCB and along an edge of the second leg proximate to the opening.

11. The data reader of claim 1, further comprising
a printed circuit board (PCB) mounted in a lower portion of the housing, and perpendicular to the front window, wherein the first socket is mounted to and electrically connected to the PCB.

12. The data reader of claim 11, wherein the first socket comprises a right angle connector.

13. The data reader of claim 12, further comprising
a second socket positioned proximate the rear wall, wherein the second socket is oriented with its opening facing toward the front window to receive a second connector of a second cable in a first direction that is oriented perpendicular to the rear wall.

14. The data reader of claim 11, further comprising:
a second socket positioned proximate the rear wall, wherein the second socket is oriented with its opening facing toward the front window to receive a second connector of a second cable in a first direction that is oriented perpendicular to the rear wall.

15. The data reader of claim 1, further comprising a removable cover disposed in the bottom portion of the housing that provides access to the cavity.

16. The data reader of claim 1, further comprising a removable cover disposed in the front portion of the housing, below the front window, that provides access to the cavity.

17. A data reader configured for connection to a cable attached to a connector, the data reader comprising:
a housing including a front portion, a rear portion and a bottom portion, the housing having a top side, a bottom side, a rear side and first and second lateral sides forming a box-shaped enclosure;
a front window disposed in the front portion of the housing;
a printed circuit board (PCB) disposed in the housing proximate and parallel to one of the rear side or the bottom side; and
a first socket mounted on an edge of the PCB proximate the other of the bottom side or rear side of the housing, wherein the first socket is oriented facing one of the front window or the top side of the housing to receive a first connector of a first cable in a first direction that is oriented perpendicular to the one of the front window or the top side, wherein the first cable is operative for providing at least one of communication and power to the data reader, the first cable forming a 180° loop within the housing and passing through an opening in a wall of the housing opposite the one of the front window or the top side of the housing, and wherein the PCB is disposed proximate to and parallel to the rear side of the housing and the 180° loop is disposed in a plane perpendicular to the front window, the first cable exiting through an opening in the bottom side of the housing.

18. The data reader of claim 17, wherein the PCB is disposed proximate to and parallel to the bottom side of the housing and the 180° loop is disposed in a plane perpendicular to the front window, the first cable exiting through an opening in the rear side of the housing.

19. A data reading system comprising a checkout counter and a data reader disposed in or on the checkout counter, the data reader including:
a housing including a front portion, a rear portion and a bottom portion, the housing having a top side, a bottom side, a rear side and first and second lateral sides forming a box-shaped enclosure;
a reader window formed in the front portion of the housing, the reader window defining a window plane;
a cavity formed in a bottom portion of the housing, the cavity including a first wall oriented substantially perpendicular to the window plane and proximate the rear wall; and
a first socket positioned in the first wall of the cavity, the first socket oriented to receive a first connector attached to a first cable in a first direction that is substantially perpendicular to the window plane.

20. The data reading system of claim 19, wherein the first cable is operative for providing at least one of communication and power to the data reader, the first cable passing through an opening in the rear wall and forming a 180° loop within the cavity.

21. The data reading system of claim 20, wherein the 180° loop is disposed in a plane perpendicular to the window plane and parallel to the bottom side of the housing.

22. The data reading system of claim 21, wherein the data reader further comprises
a printed circuit board (PCB) disposed in the rear portion of the housing, and parallel to the reader window, wherein the first socket is mounted to and electrically connected to the PCB.

23. The data reading system of claim 19, wherein the data reader further comprises:

a printed circuit board (PCB) disposed in the rear portion of the housing, and parallel to the reader window, wherein the first socket is mounted to and electrically connected to the PCB.

24. The data reading system of claim 20, wherein the data reader further comprises
a printed circuit board (PCB) disposed in the rear portion of the housing, and parallel to the reader window, wherein the first socket is mounted to and electrically connected to the PCB.

25. A method of forming a data reader configured for connection to a cable attached to a connector, the method comprising:
forming a housing including a front portion, a rear portion and a bottom portion, the housing having a top side, a bottom side and first and second lateral sides extending between the front portion and the rear portion;
disposing a front window in the front portion of the housing;
forming a cavity in the bottom portion of the housing, wherein the cavity includes a rear wall that is parallel to the front window; and
disposing a first socket proximate the rear wall, wherein the first socket is oriented with its opening facing toward the front window to receive a first connector of a first cable in a first direction that is oriented perpendicular to the front window.

* * * * *